US006892936B2

(12) United States Patent
Riggert et al.

(10) Patent No.: US 6,892,936 B2
(45) Date of Patent: May 17, 2005

(54) SERVICE INTERLINK

(75) Inventors: Charles R. Riggert, Metamora, IL (US); Mark A. Sauvageau, Minonk, IL (US); Theodore E. Wiersema, Peoria, IL (US)

(73) Assignee: Caterpillar, Inc, Peoria, IL (US)

( * ) Notice: Subject to any disclaimer, the term of this patent is extended or adjusted under 35 U.S.C. 154(b) by 15 days.

(21) Appl. No.: 10/147,025

(22) Filed: May 16, 2002

(65) Prior Publication Data
US 2003/0213839 A1 Nov. 20, 2003

(51) Int. Cl.$^7$ ............................................. G06F 17/00
(52) U.S. Cl. ...................... 235/375; 235/376; 702/183; 702/185; 701/29
(58) Field of Search .................... 235/375, 376, 235/377, 378, 384; 702/183, 184, 185; 700/99; 701/29; 705/27

(56) References Cited

U.S. PATENT DOCUMENTS

| | | | |
|---|---|---|---|
| 5,657,233 A | * | 8/1997 | Cherrington et al. ........ 705/400 |
| 6,170,742 B1 | | 1/2001 | Yacoob |
| 6,292,806 B1 | | 9/2001 | Sandifer |
| 6,487,479 B1 | * | 11/2002 | Nelson .......................... 701/29 |
| 2001/0042030 A1 | * | 11/2001 | Ito et al. ....................... 705/27 |
| 2002/0007225 A1 | * | 1/2002 | Costello et al. ............... 700/99 |
| 2002/0038262 A1 | * | 3/2002 | Fukuda et al. ................. 705/27 |
| 2002/0045986 A1 | * | 4/2002 | Tamaru ........................ 701/211 |
| 2002/0073012 A1 | * | 6/2002 | Lowell et al. ................ 705/37 |
| 2002/0161617 A1 | * | 10/2002 | Washburn et al. ............. 705/8 |
| 2003/0138475 A1 | * | 7/2003 | Chen .......................... 424/435 |

FOREIGN PATENT DOCUMENTS

WO WO 01/95133 A2 * 12/2001

* cited by examiner

*Primary Examiner*—Jared J. Fureman
(74) *Attorney, Agent, or Firm*—W Bryan McPherson

(57) ABSTRACT

A system and method of servicing a machine is disclosed. The machine has a plurality of components manufactured by a plurality of suppliers. At least a first component being manufactured by a first supplier and at least a second component being manufactured by a second supplier. In the method a response to a request from a machine manufacturer or a customer of the machine is made. A problem with at least one of the plurality of components of the machine is accessed. In accessing the problem at least one of a plurality of repositories having information pertinent to the problem and to a configuration of at least one of the plurality of components is accessed. A service related action is contemplated based on at least one of viewing the repository and the assessment of the problem in combination with the information pertaining to at least one of the plurality of components.

18 Claims, 13 Drawing Sheets

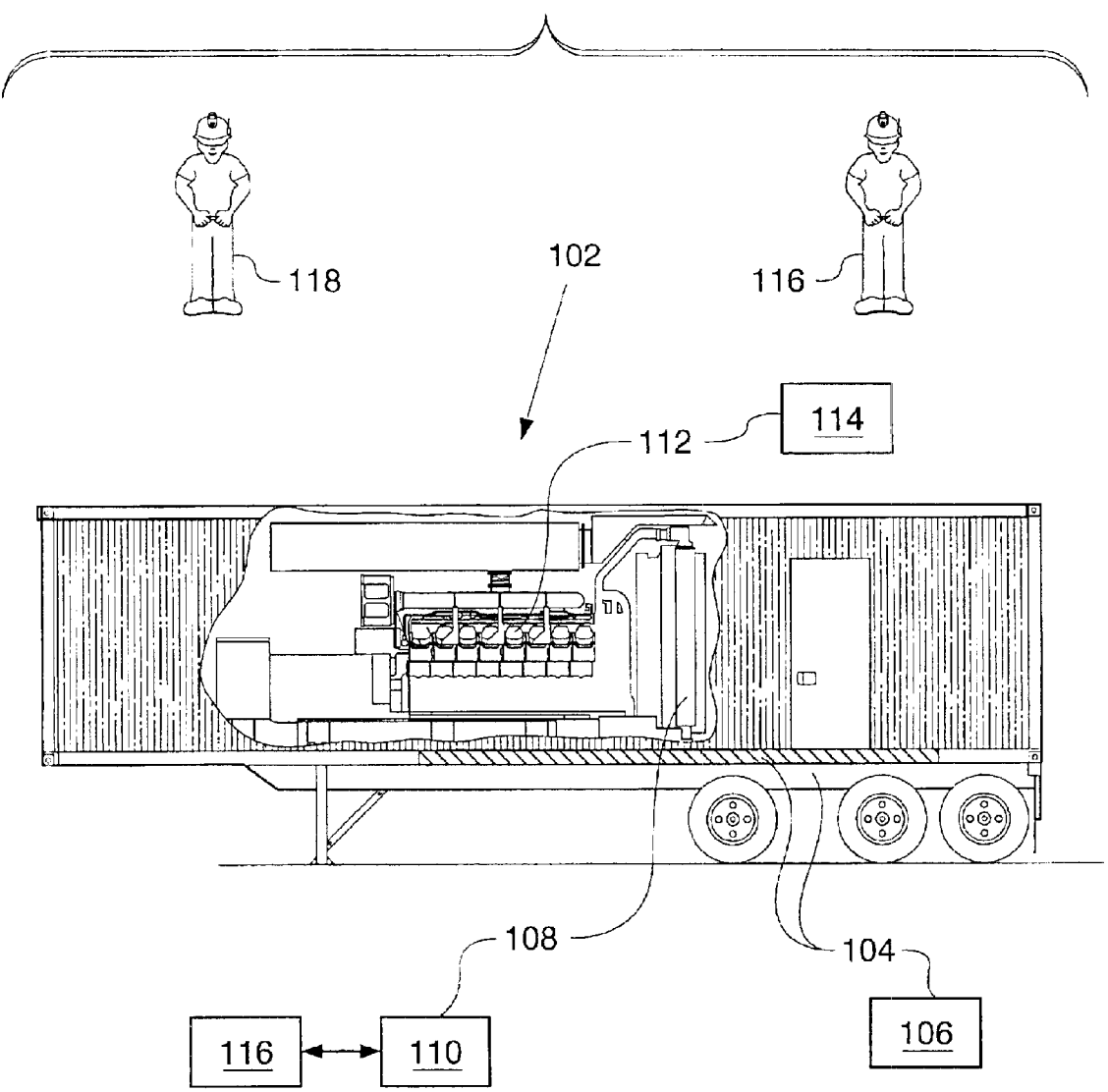

Fig. 2

| | | | OEM Service Interlink |
|---|---|---|---|
| Home | Search | Provider Login | Help | Plug-ins |

Search     [ Begin Search ] [ Clear ]

*Please select a Reason for Inquiry* — 206

*Reason for Inquiry: [BLACK SMOKE ▼]

→ 202

*Please enter your information* — 208    *Please select search criteria* — 204

| | | | |
|---|---|---|---|
| Dealer: | 08 | *OEM: | — 226 |
| Full Name: | | Product Type: | — 228 |
| E-mail Address: | | OEM Model: | — 230 |
| *Country: | USA | Component Model: | — 232 |
| *City: | Peoria | Component HP: | — 234 |
| *State / Province: | IL | Comp. Serial # Prefix | |
| *Phone: | 61127 | Results Per Page | [10 ▼] |
| *Customer Name: | TEST | | |
| *Customer Phone: | TEST | | |

210, 212, 214, 216, 218, 220, 222, 224

*Fields with an asterisk are the fields required to perform a search.*

Fig. 3.

| | | | | | |
|---|---|---|---|---|---|
| | | | | | *OEM Service Interlink* |
| Home | Search | Provider Login | Help | Plug-ins | |

Results 1 - 2 of 2

Click on an OEM Model to view additional details.

| OEM Model | Component Model | Component HP | Component Serial # Prefix | Selling Dealer |
|---|---|---|---|---|
| 465 VIPER | C-15 | 450 | BEM | MOSSVILLE IND. ENGINE FACTORY DIRECT |
| SC/MC-4 SCORPION | 3306 | 265 | 642 | MOSSVILLE IND. ENGINE FACTORY DIRECT |

304 Component Model
306 Component HP
308 Component Serial # Prefix
310 Selling Dealer
312
302
314 — 316 — 318 — 320 — 322

FIG_4a

---

| | | | | OEM Service Interlink |
|---|---|---|---|---|
| Home | Search | Provider Login | Help | Plug-ins |

Details for
Product Type: BLAST HOLE DRILL
OEM Model: Model Z

[ Previous ]  ⎯402

To view a file, left click on one of the links below. *(Note: You may need plug-ins or helper applications to view some files.)*

To download a file, right click on one of the links below and select "Save Link As" if you are using Netscape Navigator, or "Save Target As" if you are using Internet Explorer. *(Note: Any file with the filename of On-line cannot be downloaded.)*

| Product Information Type | Description | Filename | Size |
|---|---|---|---|
| OEM Contacts ⎯404 | OEM contacts' names and phone numbers | On-line | N/A |
| Dealer Contacts ⎯406 | Dealer contacts' names and phone numbers | On-line | N/A |

Fig_4b_

| | | | | |
|---|---|---|---|---|
| | | | *OEM Service Interlink* | |
| Home | Search | Provider Login | Help | Plug-ins |

| | Details for<br>Product Type: Blast Hole Drill<br>OEM Model: Model Z | | Previous | |
|---|---|---|---|---|
| Dealer Contacts —406 | Dealer contacts' names and phone numbers | On-line | N/A | —402 |
| Audit Information —408 | Model Z Installation Audit Summary | Audit-1976.pdf | 100 KB | |
| Dealer Added 1st Party Content —410 | Dealer Added 1st Party part descriptions | DACP-1976.pdf | 20 KB | |
| Dealer Added Non-1st Party Content —412 | Dealer Added Non-1st Party part descriptions | DANCP-1976.pdf | 26 KB | |
| WARRANTY INORMATION —414 | Drill Product Warranty Guide | OEM-1977.PDF | 13 KB | |

Fig. 5

```
                                                        OEM Service Interlink
| Home | Search | Provider Login | Help | Plug-ins |
                        OEM Contacts
                                                        [ Previous ]
      ┌520
 Sales: ┌518
 Phone:
 E-mail: ──── 516
        ┌514
 Service:
 Phone: ┌──── 512
 E-mail: ┌510
              ──── 508
 Technical Support:
 Phone:
 E-mail: ── 506
      ┌504
```

502

```
                                                    OEM Service Interlink
 Home  |  Search  |  Provider Login  |  Help  |  Plug-ins
                            Dealer Contacts
                  for MOSSVILLE IND. ENGINE FACTORY DIRECT
                                                                            ⎫
     Sales: — 604                                                           ⎬ — 602
     Phone: — 606
     E-mail: — 608

Service: — 610
     Phone: — 612
     E-mail: — 614

Technical Support: — 616
     Phone: — 618
     E-mail: — 620
```

_Fig_7_

OEM Service Interlink

| Home | Search | Provider Login | Help | Plug-ins |

Caterpillar Industrial Engine Installation Audit Summary ╱ 702

Date Of Audit: _____  Installation Audit No. _____

OEM Name/Location _____ OEM Model   SCORPION
Cat Dealer Name/Location   MOSSVILLE IND. ENGINE FACTORY DIRECT
Cat Dealer or Audit Contact _____ Position _____ Phone _____
Equipment/Type _____
Application _____
Engine Model _____ S/N _____ Core Arr _____ PA/PL _____
☐ DI  ☐ PC  ☐ NA  ☐ T  ☐ TA-JW  ☐ TA-ATAAC  ☐ EPA  ☐ EEC  ☐ NONCERT
Rating _____ Bhp/Bkw  Speed _____ rpm  Hi Idle _____ rpm  Lo Idle _____ rpm
Estimated Annual Machine Sales _____

1 - POWER TRANSMISSION SYSTEM
1 Flywheel Driven Equipment   Type _____ Make _____ Model _____
  ☐ Clutch  ☐ Coupling   Size/Type _____ Make _____ Model _____
2 Flywheel Housing is SAE # _____ ☐ Dry ☐ Wet  Adapter from SAE # ____ to ____  P/N _____
3 Auxiliary Equipment Driven from Engine
  Item _____ Max HP/kW _____ Driven By _____ At ____ X Engine Speed 103%  1 of 6   8.5 x 11 in

Fig_8_

Fig_9_

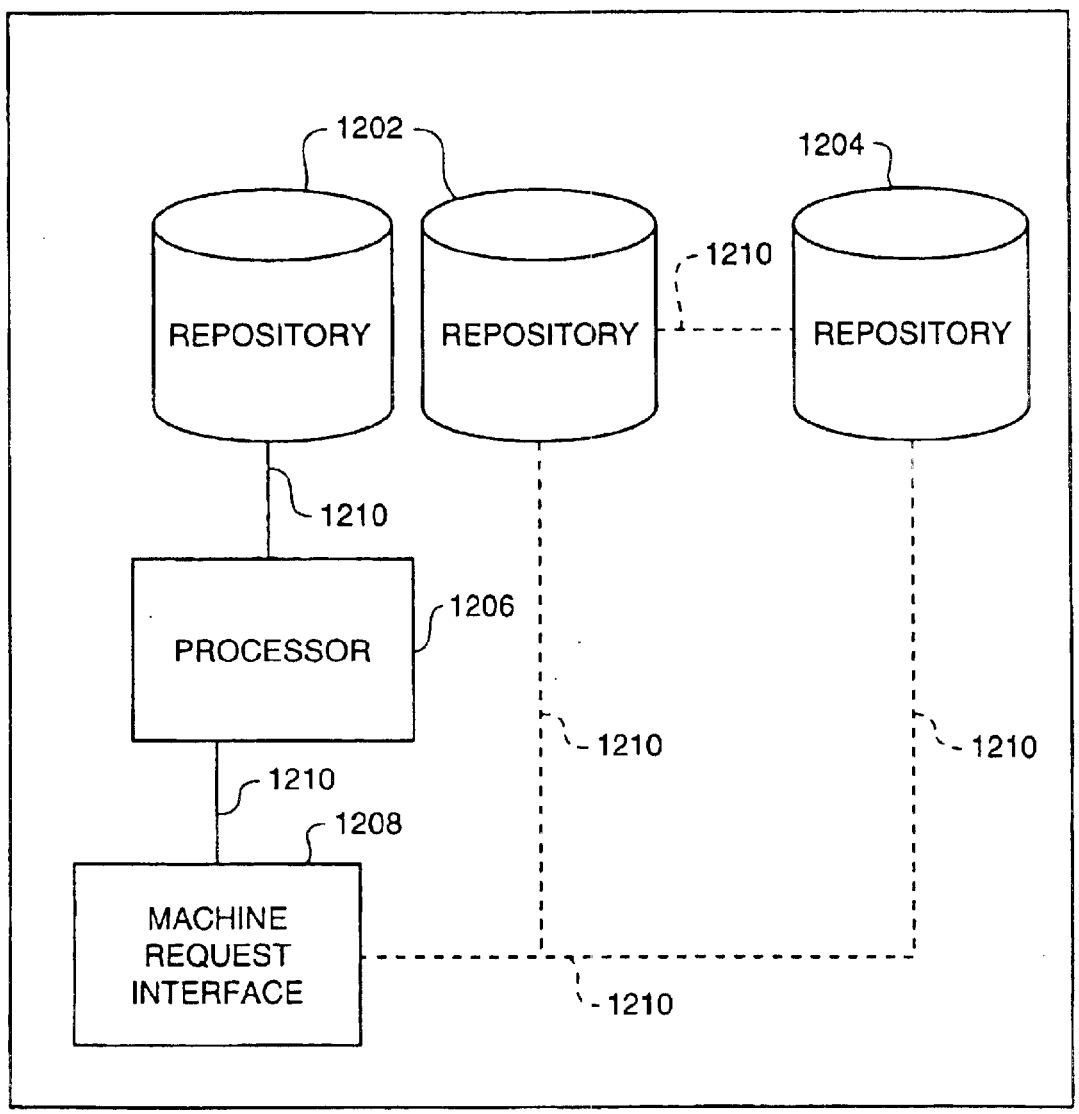

US 6,892,936 B2

SERVICE INTERLINK

TECHNICAL FIELD

The present invention relates generally to a method and system of servicing a machine and more particularly to a method and system of servicing a machine made of a plurality of components supplied by a plurality of suppliers.

BACKGROUND

Currently, a dealer sells a component, such as an engine to an Original Equipment Manufacturer (OEM). The OEM incorporates the engine into a machine, which is manufactured by the OEM. The OEM may add additional components in manufacturing the machine. For example, a stump grinder manufacturer may purchase a radiator from another supplier and incorporate the radiator, engine and grinder into the final machine. In this example, the radiator may only cool the engine on days less than 30 degrees Celsius. The stump grinder manufacturer sells the stump grinder to a customer. The customer uses the stump grinder on a hot day, the engine overheats, and the stump grinder stops working due to engine failure. The customer calls the stump grinder manufacturer, who calls the engine manufacturer. The engine manufacturer sends a service person to inspect the engine. The only information the service person has is of the engine. For example, the design parameters of the upper threshold of the radiator are not available to the service person. The service persons' inability to access this type of information leads the service person to believe the root cause of the problem lies with the engine. Therefore, the service person may search in vain for the cause of the engine failure and the stump grinder remains inoperable for a longer period than desired. The cause of the engine failure may go undetected and cause the engine dealer to pay for a warranty repair, when in fact the cause of the engine failure (i.e. the cooling system), was not covered by the engine warranty. The machine may be repaired and fail a second time for the same reason before the actual cause of the failure is determined. Therefore, lack of knowledge of the other components of the machine caused excess downtime, higher repair costs, and a disgruntled owner.

The present invention is directed to overcoming one or more of the problems set forth above.

SUMMARY OF THE INVENTION

A method of servicing a machine, having a plurality of components, manufactured by a plurality of suppliers, at least a first component being manufactured by a first supplier and at least a second component being manufactured by a second supplier, by responding to a repair request, next the problem with at least one of a plurality of components is assessed and a repository having a plurality of components associated with machine configuration information is accessed and a service related action based on at least one of viewing the repository and the assessment of the problem with at least one of the plurality of components associated with the machine is determined.

A machine service system, the machine including a plurality of components, the plurality of components being manufactured by a plurality of suppliers, at least a first component of the plurality of components being manufactured by a first supplier of the plurality of suppliers and at least a second component of the plurality of components being manufactured by a second supplier of the plurality of suppliers; the system having a first computer based repository and a second computer based repository, with the first computer based repository having first and second application proxies and a binary network object with first and second interfaces, the first application proxy being coupled to the first computer repository and the second application proxy being coupled to the second computer repository, wherein the first computer based repository has access to information in the second computer based repository.

BRIEF DESCRIPTION OF THE DRAWINGS

FIG. 1 is a screen shot of one embodiment of a machine in an environment associated with the present invention;

FIG. 2 is a screen shot displaying a search form of an embodiment of the present invention;

FIG. 3 is a screen shot displaying the OEM information selected in FIG. 2 including all OEM models for the selected OEM of an embodiment of the present invention;

FIG. 4a is a screen shot displaying the OEM model information selected in FIG. 3 of an embodiment of the present invention;

FIG. 4b is a continuation of the screen shot in FIG. 4a displaying additional OEM model information selected in FIG. 3 of an embodiment of the present invention;

FIG. 5 is a screen shot displaying the OEM contact information selected in FIG. 4a and FIG. 4b of an embodiment of the present invention;

FIG. 7 is a screen shot displaying audit information selected in FIG. 4a and FIG. 4b of an embodiment of the present invention;

FIG. 8 is a screen shot displaying a dealer added first party content information selected in FIG. 4a and FIG. 4b of an embodiment of the present invention;

FIG. 9 is a screen shot displaying the dealer added first party non-content information selected in FIG. 4a and FIG. 4b of an embodiment of the present invention;

FIG. 12 is a diagram of a service system associated with the present invention.

DETAILED DESCRIPTION

Figure 6:
FIG. 6 is a screen shot displaying the OEM dealer contact information selected in FIG. 4a and FIG. 4b of an embodiment of the present invention.

In FIG. 1, a machine 102 is represented. The machine is made from a plurality of components 104,108,112, supplied by a plurality of suppliers 106,110,114. A first supplier 110, of the plurality of suppliers 106,110,114 supplies a first component 108, of the plurality of components 104,108,112. A second component 112, of the plurality of components 104,108,112, is supplied by a second supplier 114, of the plurality of suppliers 106,110,114. A service person 116 of the first supplier 110 and an owner or customer 118 is represented.

FIG. 2 illustrates a screen shot 202 based on information stored in a repository, of a search form associated with the present invention. The reason for the search may be to try and find similar problems other customer's 118, selling dealers 312 or manufacturers 110, had in the past in regards to a problem. In one embodiment, the search form has fields 202, 206, 214, 216, 218, 220, 222 and 224 that may be used to perform a search. The first field 206, which is a reason for the search, is selected. The selection is performed from a pull down menu 206 or is typed in. The next field relates to the location of the person filling out the search form and includes the country 214, the city 216, the state 218, the phone number 220, the customer 118, the name 222, the customer 118, the phone number 224 and the OEM 204. Additional fields such as, information about the product type 226, the OEM model number 228, the component model number 230, the component horsepower 232 and the component serial number 234 may be entered.

FIG. 3 illustrates a screen shot 302 based on information stored in a repository, displaying information associated with an OEM based on the OEM selected in a control block 204 of FIG. 2. In the embodiment shown, the screen shot 302 displays additional details about the OEM model 304, such as component model 306, component horsepower 310 and selling dealer 312. In one embodiment, all OEM models for the OEM are displayed. Model Z 314, is displayed with the corresponding information Model 316 (3306), Horsepower 318 (265), Prefix 320(64Z) and Selling Dealer 322 (factory direct). Additional information about the OEM model 304 may be viewed by clicking on a specific OEM model, for instance model Z 314.

FIGS. 4a and 4b illustrate a screen shot 402 based on information stored in a repository, when the user clicks on model Z 314 in FIG. 3. In the embodiment shown, the OEM contacts 404, the dealer contacts 406, audit information 408, the dealer added first party content 410, the dealer added non-first party content 412 and the warranty information 414 are displayed on the screen.

FIG. 5 is a screen shot 502 based on information stored in a repository; displaying information associated with OEM contact information 404. The user may access screen shot 502 by activating contact information 404. Selecting the OEM contact information 404 link in FIG. 4a, may access the information. In the embodiment shown, the information associated with an OEM contact, may include; the sales person name 520, the sales person phone number 518, the E-mail address 516, the service name 514, the phone number of the service person 512, the E-mail of the service person 510, the technical support name 508, the phone number of the technical support name 506 and the E-mail address of the technical support person 504.

FIG. 6 is a screen shot 602 based on information stored in a repository, displaying information associated with Dealer Contact information 406. Selecting the Dealer Contact 406 link in FIG. 4b may access the information. In the embodiment shown, the information in screen shot 602 includes, the sales person name 604, the phone number of the sales person 606, the E-mail of the sales person 608, the service person's name 610, the service person's phone number 612, the service person's e-mail address 614, the technical support person's name 616, the technical support person's phone number 618, the technical support person's E-mail address 620.

FIG. 7 is a screen shot 702 based on information stored in a repository; displaying information associated with Audit information 408. The Audit has information about the OEM Model. This information may include each component of the model. Selecting the Audit information 408, link in FIG. 4b may access the information. In the embodiment shown, the information in screen shot 702 includes, the date of the audit, the installation audit number, the OEM name and the location, the OEM model number 304, the Dealer location and the contact information, the equipment type, and the detailed audit form that includes questions about components of the equipment.

FIG. 8 is a screen shot 810 based on information stored in a repository; displaying information associated with Dealer added first party information 410. Selecting the Dealer added first party information 410, in FIG. 4b might access the information. In the embodiment shown, the information in screen shot 810 includes, the OEM name, the product type, the OEM model 304, the first party dealer name. The information may also include detailed questions on the form about the dealer added first party content 410.

FIG. 9 is a screen shot 910 based on information stored in a repository; displaying information associated with Dealer added non-first party content information 412. Selecting the Dealer added non-first party information 412 in FIG. 4b might access the information. In the embodiment shown, the information in screen shot 910 includes the OEM name, the product type, the OEM model 304, the dealer name, and includes detailed dealer added non-first party information 412. The dealer added non-first party 412 might include any dealer that is not the original first dealer.

Figure 10:
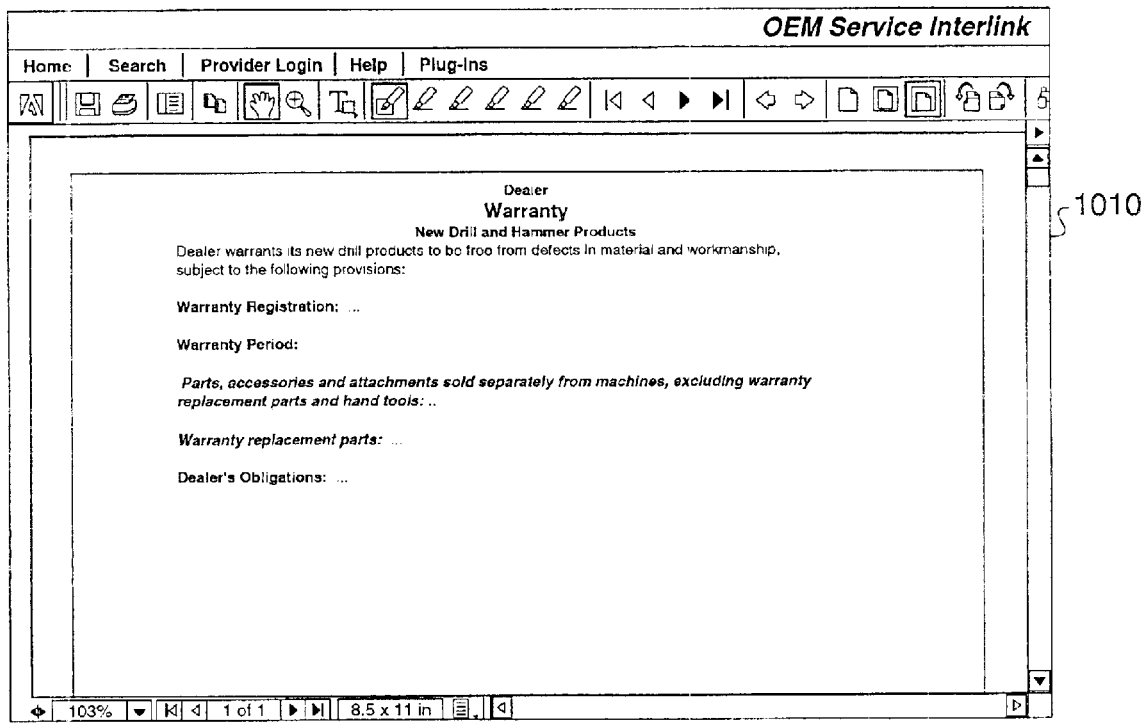
FIG. 10 is a screen shot displaying a warranty information selected in FIG. 4a and FIG. 4b of an embodiment of the present invention.

FIG. 10 is a screen shot 1010 based on information stored in a repository; displaying information associated with Warranty information 414. Selecting the Warranty information 414 in FIG. 4b might access the information. In the embodiment shown, the information in screen shot 1010 may include, warranty information 414 which may include the warranty registration, the warranty period, the warranty replacement parts, the parts, the accessories and attachments sold separately from machines, the excluding warranty replacement parts and other detailed warranty information.

Figure 11:
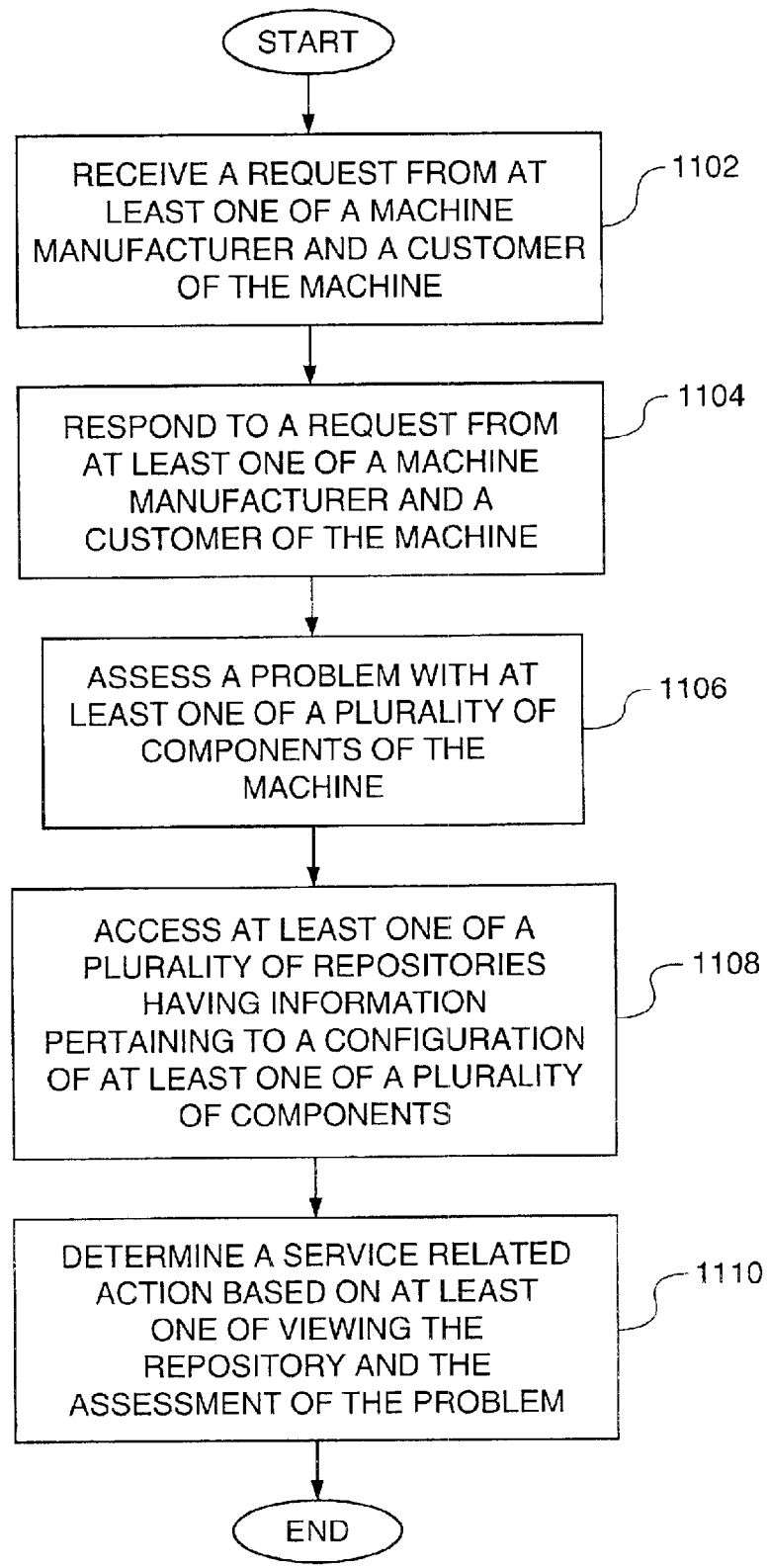
FIG. 11 is a flow diagram of a method of servicing the machine of an embodiment of the present invention.

FIG. 11 illustrates one embodiment of a method of the present invention. In a first control block 1102, a machine repair request is received. The request may be received from a first manufacturer 110, customer 118, or someone else associated with the machine 102. The request may be received electronically 102 by means of a computer network, data network, the Internet or a wireless data transmission. Other conventional alternatives can also be used to receive the request, such as the telephone, fax or the mail.

In a second control block 1104, a response is initiated based on the request. The response may include the dispatching of the service person 116 to the location of the machine 102. In another embodiment the response is to telephone the requesting manufacturer or customer 118 to get information about the machine repair request associated with the machine 102. The machine repair request includes a problem associated with the machine. In another embodiment the machine 102 in need of repair may be brought to the selling dealer 312 and the response is to assign a service representative to the repair request.

In a third control block 1106, an assessment of the problem is performed on at least one of a plurality of components 104 of the machine 102. In one embodiment the assessment of the problem on the machine 102 is by physical electronic examination performed by a service person 116. In another embodiment the assessment of the problem 1106 on the machine 102 is performed by communication between the service person 116 and the customer 118. In this embodiment the oral communication is by telephone, computer or videoconference.

In a fourth control block 1108, at least one repository, having information pertaining to a configuration of at least one of a plurality of components 114 is accessed. In one embodiment, a repository has information about the complete machine 102. The information may include, service manuals, performance specifications such as upper and lower limit specs, OEM contacts 404, dealer contacts 406, audit information 408, warranty information 414, dealer added first party content 410, and dealer added non-first party content 412.

In a fifth control block 1110, a service related action based on at least one of or combination of information stored in the repository and the assessment of the problem 1106 is determined. In one embodiment the service related action determined 1110 is to replace a component. Alternatively, multiple components 114 might be determined to be in need of replacement as a result of the service related action 1110. In an alternative embodiment, a part comprising a component might be determined to be in need of replacement. Alternatively, multiple parts comprising a component might be determined to be in need of replacement.

FIG. 12 is one embodiment of the hardware implementation associated with the present disclosure. The present disclosure includes a service system 1200 associated with a machine 102, which may include a plurality of components 104 manufactured by a plurality of suppliers 106 with at least a first component 108 of the plurality of components 104 being manufactured by a first supplier of the plurality of suppliers 106 and a second component 112 of the plurality of components 104 being manufactured by a second supplier 114 of the plurality of suppliers 106. The service system 1200 comprises at least one repository having information associated with configuration information associated with the machine 102 configuration and may include the plurality of components 104 and the plurality of suppliers 106. A machine request interface 1208 is configured to receive at least one machine repair request 1102 and a machine component request from a representative of the first supplier, the machine request includes at least one machine identifier characteristic with the machine component request being associated with the component manufactured by the second supplier. The machine identifier characteristic may include the model, name, serial number or other identification number of the machine. The machine component request may include configuration or manufacturer maintenance information associated with one or more components. Next, a processor 1206 is configured to receive the machine identifier characteristic, which accesses at least one repository and responsively displays configuration information associated with the machine component request and responsively displays configuration information associated with the component. For example, a machine request interface includes electronic connections such as; an Internet connection, network connection, wireless data connection and peer-to-peer connection for receiving electronic request including e-mail messages, instant messages and voice over I.P. messages. The machine request interface includes a manual input device such as a keyboard, palm pilot, personal digital assistant, mouse, cell phone, or microphone.

In one embodiment, the service system includes a first and second computer based repositories. The second computer-based repository 1204 may have information about a plurality of components 104 associated with the machine 102. The first computer-based repository 1202 receives information from the second computer-based repository 1204. A service person 116 or selling dealer 312 may access the first computer-based repository 1202. The information provided by the second computer-based repository 1204 may include, diagnostic information, historical information, contact information, audit information 408 and warranty information 414 associated with the machine 102. The information associated with the machine may be pushed to the first computer-based repository 1202 by the second computer-based repository 1204. Alternatively, the information associated with the machine 102 may be pulled from the second computer-based repository 1204 to the first computer-based repository 1202.

INDUSTRIAL APPLICABILITY

The present disclosure includes a method and system used in the servicing of a machine 102. The machine 102 has a plurality of components 114, the plurality of components 114 being manufactured by a plurality of suppliers 106. The present disclosure enables a service person 116 to determine a service related action for a machine problem based on accessing a service interlink repository and the service person's 116 assessment of the problem.

For example, a dealer sells an engine to an OEM. The OEM incorporates the engine into a stump grinder, which is manufactured by the OEM. The OEM adds a radiator from another supplier and incorporates the engine, stump grinder and radiator into a marketable machine 102. The OEM or dealer associated with the OEM sells the marketable machine 102 to a customer 118. The customer 118 uses the machine 102 on a 40 degree Celsius day and the machine 102 stops working. The customer 118 places a machine repair request via the telephone, computer, Personal Digital Assistant (PDA) or pager to the OEM manufacturer, who contacts the engine manufacturer via a telephone, pager, PDA or computer. The engine manufacturer dispatches a service person 116 to inspect the engine. The service person 116 uses his laptop to access the service interlink repository 1108 via the Internet. Alternatively, the service person 116 may use a wireless device such as a cellular phone or PDA to access the repository 1108.

Once the service person 116 accesses the repository 1108, the present disclosure allows the service person 116 to determine a number of relevant items. For example, the service person 116 is able to determine what other components were added to the stump grinder and sold to the customer 118. An OEM dealer may sell standard configurations or non-standard configurations for their machines. In this example the service person 116 is checking information associated with the standard configuration and dealer add-ons. In this example the service person 116 is able to dive down to the specific configuration information for this specific machine. The service person 116 may select a reason for the inquiry, displayed in FIG. 2. Once a specific problem is selected in FIG. 2, FIG. 3 is displayed. FIG. 3 is a screen shot from the repository, displaying the OEM information, including the OEM model 304, the Component Model 306, and the Component HP 308. In the present example the service person 116 accessing the repository 1108 may be able to determine the stump grinder was sold with a particular engine and particular radiator. The repository may have detailed information about the radiator used with this machine 102 that otherwise may not be available to the service person 116. In this example the radiator can only cool an engine on a workday having a maximum heat level of not greater than 30 degrees Celsius. Once the service person 116 accesses the repository 1108 he obtains information about the radiator. In one embodiment the repository may access another repository, such as a manufacturers repository, though a link. With this knowledge the service person 116 is able to determine the engine on the stump grinder overheated because the radiator will only cool up to 30 degrees Celsius and the temperature that day was 40 degrees Celsius. With this knowledge the service person 116 can save time and is able to troubleshoot the repair problem by looking directly at the overheating of the engine as a reason for the failure. The service person 116 may fix the machine 102 based on this new information. This results in the machine 102 being out of operation for a shorter period of time, which results in a more satisfied customer 118.

As a result of fixing the machine 102, the service person 116 uses the present disclosure to inform the radiator manufacturer of what the problem and solution was. This may result in the radiator manufacturer re-designing the product or selling it with a disclaimer about temperature use. This may also allow the radiator manufacturer to contact other customers 118 that purchased similar radiators and may use them in a similar manner, warning them of potential problems if used above 30 degrees Celsius.

In addition, the present disclosure allows the user to search the repository by specific problem. For example, a search is performed based on black smoke coming from the machine 102. FIG. 2 is a screen shot of an inquiry for black smoke coming from a machine 102. The user selects black smoke from a pull down menu as the reason for the inquiry. All problems that had black smoke as a symptom show up as a result of the search. This allows the user to look at other similar problems, which results in a faster and more accurate diagnosis of the current problem.

In addition, the user may search the repository by a serial number. For example, a search performed based on the serial number of an engine may display all of the components added to the specific engine or to whom the engine was sold, and what additional components were added to the machine 102 the engine is currently associated with. FIG. 2 is a screen shot that displays criteria in which a search may be performed, including by component serial number 234. By using the serial number a component like the engine in the previous example may be tracked. This allows the service person 116 to quickly obtain information about components and configurations associated with the engine. For example, by tracking the engine by serial number, the service person 116 may determine the engine is being used by a stump grinder and radiator x is also associated with the stump grinder. This may allow the service person 116 to know what is associated with the engine before he is dispatched on a service call. In addition, this enables easy identification to the configuration, which enables a more knowledgeable assessment of the problem.

In addition, the user may search the repository by multiple criteria, for example, by OEM 204, Product Type 226 and OEM Model 228. The search results may be displayed on a monitor, cell phone or PDA. The search results may include OEM Contacts 404, Dealer Contacts 406, Audit information 408, Dealer added first party content 410, Dealer added non-first party content 412 and warranty information 414. FIG. 2 is a screen shot displaying the multiple criteria in which the user may search. The search results allow the user to obtain information that is useful in solving a repair problem. For example, OEM contact information has the sales, service and technical support names, phone numbers and e-mail information of the individuals that may be contacted. This access of information allows for quicker resolution of a problem in the field.

In one embodiment, the present disclosure includes a system used in the servicing of a machine 102, with the machine 102 having a plurality of components 114, the plurality of components 114 being manufactured by a plurality of suppliers 106. The present invention enables a service person 116 to determine a service related action 1110 for a machine problem 1106 based on at least one of information associated with the service interlink repository and the service person's 116 assessment of the problem 1106.

For example, the system may include a first computer-based repository and a second computer based repository with each repository having the ability to communicate with the other. A service person 116 may use the first computer based repository to communicate with the second computer based repository. In this example the service person 116 wants to retrieve diagnostic information about the machine 102. The first computer based repository retrieves the diagnostic information about the machine 102 from the second computer based repository. The second computer-based repository may get the diagnostic information about the machine 102 from other repositories or the diagnostic information may be updated in the repository.

An example of the second-computer based repository getting diagnostic information about the machine 102 from other repositories is as follows. There may be one or more repositories. These repositories may be connected together through a computer network, the Internet or wireless connections. Alternatively, these repositories may not be connected together, but rather may be independent of each other. In one embodiment, the repository may provide automatic updates to each other, or automatically make update requests. For example, where the repositories are connected together, the repositories either pull or push information to each other. In the example of the repository pulling information, repository x may pull or ask for information from repository y. A computer program may constantly run on repository x, updating specific information from repository y. For example, repository x may pull repository y for information about an OEM contact 404. Repository y may send information about the OEM contact 404 to repository x. This process may be repeated throughout the day with repository y responding to the request from repository x. If the OEM contact 404 information were updated in repository y, then repository x may be updated as a result of the pulling.

An example of how a push works is as follows. Repository y may wish to constantly update information to other repositories. Repository y may push or send information to other repositories. For example Repository y may push OEM contact 404 information to repositories x, t and w but not n and g. In this example, a stream of information about the OEM contact 404 may be sent to repositories x, t and w but repositories n and g may not receive this information. In this aspect, repository y maintains control over which repositories get the information. In this example, repository y may charge a fee to push information to the other repositories.

In the alternative, the repositories may not be connected to each other. In this example repository x may have all of the information needed on a machine 102 or repository x may have partial information on machine 102. This information may be updated by CD, data tape or manually inputted.

Other aspects, objects and advantages of this invention can be obtained from a study of the drawings, the disclosure and the appended claims.

What is claimed is:

1. A method of servicing a machine, said machine including a plurality of components, manufactured by a plurality of suppliers, at least a first component of said plurality of components being manufactured by a first supplier of said plurality of suppliers and at least a second component of said plurality of components being manufactured by a second supplier of said plurality of suppliers; said method comprising:

responding to a machine repair request;

assessing a problem with said first component;

accessing at least one of a plurality of repositories, having information pertinent to said problem and to a configuration of at least one of said plurality of components;

diagnosing said problem associated with said first component in response to the operation of said second component, said problem assessment, said configuration, and said repository information; and determining a service related action, in response to said diagnosis.

2. The method of servicing a machine of claim 1 including a communication with said machine manufacturer based on at least one of a characteristic of said service related action, said communication including said problem diagnosis.

3. The method of servicing a machine of claim 1 including updating at least one of said plurality of repositories with an addition of information based on a characteristic of said service related action, said information including a characteristic of said second component that caused said problem with said first component.

4. The method of servicing a machine of claim 1 wherein said plurality of repositories being a single repository having said information pertaining to each of said plurality of components therein.

5. The method of servicing a machine of claim 1, wherein at least one of said plurality of suppliers being said machine manufacturer.

6. The method of servicing a machine of claim 1, wherein accessing at least one of said plurality of components includes a pre-established code.

7. The method of servicing a machine of claim 1, wherein the step of diagnosing said problem further comprises the step of said first supplier diagnosing the problem associated with said first component based on the operation of said second component manufactured by said second supplier.

8. The method of servicing a machine of claim 1, wherein said repository has configuration information on said machine itself.

9. A service system associated with a machine, said machine including a plurality of components manufactured by a plurality of suppliers, at least a first component of said plurality of components being manufactured by a first supplier of said plurality of suppliers and at least a second component of said plurality of components being manufactured by a second supplier of said plurality of suppliers; comprising:

at least one repository having information associated with a configuration associated with said machine, said configuration including said plurality of components and said plurality of suppliers;

a machine request interface configured to receive at least a machine repair request and a machine component request from a representative of said first supplier, said machine repair request including at least a machine identifier characteristic, said machine component request being associated with a component manufactured by said second supplier;

a processor configured to receive said machine identifier characteristic, access said at least one repository, responsively display configuration information associated with said machine and receive said machine component request and responsively display configuration information associated with said component, said processor being configured to receive a problem statement associated with said first component, access said configuration information from said at least one repository, and diagnose said problem in response to an operation of said second component, and said configuration information.

10. A system as set forth in claim 9, wherein said at least one repository includes a first repository configured to provide diagnostic information for said machine.

11. A system as set forth in claim 10, wherein a second repository provides said diagnostic information for said machine to said first repository.

12. A system as set forth in claim 9, wherein said at least one repository includes a first repository configured to provide historical information for said machine.

13. A system as set forth in claim 12, wherein said a second repository provides said historical information for said machine to said first repository.

14. A system as set forth in claim 9, wherein said at least one repository includes a first repository configured to provide contact information for said machine.

15. A system as set forth in claim 14, wherein a second repository provides said contact information for said machine to said first repository.

16. A system as set forth in claim 9, wherein said at least one repository includes a first repository configured to provide warranty information for said machine.

17. A system as set forth in claim 16, wherein a second repository provides said warranty information for said machine to said first repository.

18. A method of servicing a machine, said machine including a plurality of components, manufactured by a plurality of suppliers, at least a first component of said plurality of components being manufactured by a first supplier of said plurality of suppliers and at least a second component of said plurality of components being manufactured by a second supplier of said plurality of suppliers; said method comprising:

assessing a problem with said first component;

accessing at least one of a plurality of repositories, having information pertinent to said problem and to a configuration of at least one of said plurality of components;

diagnosing said problem associated with said first component in response to the operation of said second component, said problem assessment, said configuration, and said repository information; and determining a service related action, in response to said diagnosis.

* * * * *